US007191435B2

(12) United States Patent
Lau et al.

(10) Patent No.: US 7,191,435 B2
(45) Date of Patent: Mar. 13, 2007

(54) METHOD AND SYSTEM FOR OPTIMIZING SOFTWARE UPGRADES

(75) Inventors: Michael Lau, Boulder, CO (US); Dean Kemp, Superior, CO (US); Clement Ng, Toronto (CA); Hong Yu, Markham (CA); Dario Atallah, Louisville, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 751 days.

(21) Appl. No.: 10/164,946

(22) Filed: Jun. 7, 2002

(65) Prior Publication Data

US 2003/0229890 A1 Dec. 11, 2003

(51) Int. Cl.
*G06F 9/44* (2006.01)
*G06F 11/00* (2006.01)

(52) U.S. Cl. .................. 717/168; 717/169; 717/120; 717/121; 714/38

(58) Field of Classification Search ........ 717/120–121, 717/131, 168–173; 714/38
See application file for complete search history.

(56) References Cited

U.S. PATENT DOCUMENTS

| 4,558,413 | A | * | 12/1985 | Schmidt et al. ............. 707/203 |
| 5,257,268 | A | * | 10/1993 | Agrawal et al. ............ 714/738 |
| 5,421,017 | A | * | 5/1995 | Scholz et al. ............... 717/170 |
| 5,430,878 | A | * | 7/1995 | Straub et al. ............... 717/162 |
| 5,500,941 | A | * | 3/1996 | Gil ............................... 714/38 |
| 5,579,509 | A | * | 11/1996 | Furtney et al. ............... 703/27 |
| 5,862,382 | A | * | 1/1999 | Kataoka ...................... 717/131 |
| 6,002,869 | A | * | 12/1999 | Hinckley ..................... 717/124 |
| 6,052,531 | A | * | 4/2000 | Waldin et al. ............... 717/170 |
| 6,219,805 | B1 | * | 4/2001 | Jones et al. .................. 714/38 |
| 6,249,769 | B1 | * | 6/2001 | Ruffin et al. .................... 705/7 |
| 6,260,020 | B1 | * | 7/2001 | Ruffin et al. .................. 705/1 |
| 6,324,692 | B1 | * | 11/2001 | Fiske .......................... 717/171 |
| 6,338,149 | B1 | * | 1/2002 | Ciccone et al. ............... 714/38 |
| 6,629,315 | B1 | * | 9/2003 | Naylor ........................ 717/168 |
| 6,651,186 | B1 | * | 11/2003 | Schwabe ....................... 714/38 |
| 6,668,340 | B1 | * | 12/2003 | Baker et al. .................. 714/38 |
| 6,678,639 | B2 | * | 1/2004 | Little et al. ................. 702/188 |
| 6,701,519 | B1 | * | 3/2004 | Cowan ......................... 717/130 |
| 6,725,399 | B1 | * | 4/2004 | Bowman ...................... 714/38 |
| 2002/0042731 | A1 | * | 4/2002 | King et al. ................... 705/10 |
| 2003/0005426 | A1 | * | 1/2003 | Scholtens et al. ........... 717/169 |
| 2003/0046681 | A1 | * | 3/2003 | Barturen et al. ............. 717/177 |

\* cited by examiner

*Primary Examiner*—Wei Zhen
*Assistant Examiner*—Qamrun Nahar
(74) *Attorney, Agent, or Firm*—Kent A. Lembke; William J. Kubida; Hogan & Hartson LLP (57) ABSTRACT

A method for analyzing impact on binaries, software, and hardware of a planned software upgrade for a computer system. The method includes performing a configuration inventory for the computer system with profiles for the computer system of hardware, software including operating system software, middleware, applications, development tools, and third party software, application interfaces, and binaries. A set of upgrade rules, e.g., rules defining hardware and software requirements including interfaces, libraries, dependencies, and more, are accessed and the binary profiles are analyzed based on the upgrade rules to determine safe binaries and at-risk binaries. The at-risk binaries are further divided into subcategories based on risks of incompatibility with the planned software upgrade. The subcategories include failure, high risk, and low risk. The method includes generating text or graphical reports providing the analysis results to quantify and qualify the impacts on binaries and other portions of the computer system.

34 Claims, 8 Drawing Sheets

METHOD AND SYSTEM FOR OPTIMIZING SOFTWARE UPGRADES

BACKGROUND OF THE INVENTION

1. Field of the Invention

The present invention relates, in general, to software upgrades in computer systems and in distributed computer networks, and, more particularly, to a system and method for analyzing an existing computer system or network to quantify potential difficulties in performing an upgrade from a current version to a newer version of the software in each or a combination of the four categories, namely operating system or operating environment, development tools, middleware, and application programs. This invention further describes tools to analyze binaries or executable programs and other features of the computer system or network to quantify or better categorize such difficulties or risks, and to effectively report such quantified risks in a manner that is readily understandable by and useful to a manager of the computer system in determining whether to make a move to the newer software version and what initial or preparation steps to perform as part of the upgrade.

2. Relevant Background

New versions of software are released and distributed regularly by software developers to provide new and enhanced software features and to address the ongoing innovations and changes in related software, in available hardware, in networking and communication technologies (such as the Internet), and in security requirements and technologies. In the software industry, the current trend is to provide updates or new versions for key software products every six months, with each new version incorporating improvements and enhancements. Hence, an important task facing computer system operators is determining when and how to make the move from an older version of a software product to a newly released version.

Unfortunately, the decision of when and how to perform a software upgrade is complicated by a number of factors. Computer systems can be very large and complex including multiple networks, varied geographic locations, and hundreds or thousands of computer and electronic devices. A large and daunting task faced by most computer system operators is to fully understand the hardware and software that make up their current system. Different levels of software are used in most computer systems, including the four categories, namely operating system or environment software, development tool software, middleware software, and application software. Software in each of these levels may be upgraded individually or in combination often with the functioning, via interfaces, shared libraries, and the like, of a particular software product affecting or relying on the operation of software products in other levels. In other words, an upgrade or change to one software product most likely will affect the operation of other software products.

An important consideration for a system manager making upgrade decisions is maintaining binary compatibility for applications built to run on earlier releases. When binaries (or executables) are not compatible or are at risk of incompatibility with an upgraded version of software, the software customer or system manager faces a dilemma. Even though a new release may be desirable from a function standpoint, the software customer may not desire to make the move if a large investment is required to revise and update numerous existing binaries to work within the upgraded environment and may decide to postpone one or more upgrades. Often worse, the software customer may simply fear the unknown or potential problems if risks of incompatibility or failure of existing binaries after the upgrade are not well defined or understood.

System managers face a challenge in balancing the demands for a highly effective and functional computer system, that urges toward performing each available upgrade, against expectations of a highly-available system and network with no or little downtime and architectural continuity, that urges toward only performing lower or no risk upgrades. System managers want to make software upgrade that can be performed smoothly without sacrificing existing investments in built binaries and other levels of software. Extensive testing is typically performed by software upgrade providers to minimize risks of implementing an upgrade but the mission critical nature of a customer's system or environment with multi-vendor supplied software applications requires careful planning, risk and benefit assessment, and detailed analysis of application binaries that may impact a successful upgrade. Further, complicating the upgrade decision and process is the fact that prior decisions to postpone upgrades often results in existing versions of software being not just one version earlier than the upgrade but instead many versions behind.

Existing system analysis and upgrade tools are not fully effective in allowing system operators and software upgrade providers to understand the effects and risks associated with performing a software upgrade on a particular computer system. For example, some hardware and software inventory tools have been developed that work to create an inventory of hardware and software in a computer system. These inventory tools create a large volume of general information or metadata for a system that is often too large in volume and too general in nature to be readily used in planning or analyzing a software upgrade. Binary analysis tools have also been developed for use in planning an upgrade. One such tool compares a binary with the new or upgraded software to provide a verification or determine a relatively low risk that the binary will operate or run with the upgraded software. While useful on a case-by-case basis, this tool does not quantify the binaries on a system or provide analysis of binaries that are not verified as compatible (i.e., higher or medium risk binaries). Other binary analysis tools act to quantify binaries on a computer system, such as by providing a total number of binaries, a number of safe or very low risk binaries, and a number of at-risk or higher risk binaries. However, the wealth or volume of information may overwhelm a system manager and not be particularly useful in deciding whether to perform an upgrade. For example, the total number of binaries in a departmental data center environment may be fifty to one hundred thousand or more and at-risk or medium risk binaries may number well into the thousands (even for relatively simple upgrades). This large, raw number of potentially incompatible or affected binaries is often simply unmanageable by a software customer and often results in the customer making the decision to not perform an upgrade because the reward of improved system performance does not appear worth the potential affect on built binaries.

Hence, there remains a need for an improved method and/or system for analyzing and defining the effects of a software upgrade on an existing computer system and existing binaries. Such a method and system would preferably function to better quantify the impact of an upgrade on application binaries and, significantly, to qualify such impact in a manner that assist a software customer in deciding whether or not to perform a software upgrade. In some cases, the method and system would further function to identify particular binaries or groups of binaries that can be revised to better perform the upgrade and would also report binary impact analysis results in a user-friendly manner to facilitate informed decision processes by a software customer.

SUMMARY OF THE INVENTION

The present invention addresses the above discussed and additional problems by providing an upgrade analysis system that functions to provide an improved method for analyzing an impact of performing a software upgrade on a computer system or network of computer devices. The upgrade analysis system includes tools, such as software devices or objects, for analyzing a configuration inventory or profile metadata for the computer system to identify incompatible portions of the computer system, to quantify risks and levels of effort for corrections, to qualify risks (especially to binaries in the computer system), and to generate impact analysis reports in text or graphical format that quickly impart quantified and qualified impacts of the upgrade.

More particularly, a method is provided for analyzing an impact on binaries of a computer system due to a planned software upgrade. The method includes performing or simply accessing a configuration inventory for the computer system. The configuration inventory includes profiles for the computer system of hardware, software including operating system software, middleware, applications, development tools, and third party software, application interfaces, and binaries. Based on the particular planned software upgrade, a set of upgrade rules (e.g., rules defining hardware and software requirements including interfaces, libraries, dependencies, and more) are developed, loaded, or simply accessed.

The binary profiles are then analyzed based on the upgrade rules to define a set of safe or very low risk binaries and at-risk (e.g., medium risk or at least higher than very low risk) binaries. The at-risk binaries are further divided into subcategories based on risks of incompatibility with the planned software upgrade and/or based on importance of the binary to operation of the customer system. The subcategories in some embodiments include failure binaries, high risk binaries, and low risk binaries. A level of effort for correcting or modifying the binaries can also be determined as well as a listing of recommended courses of actions to remedy identified impacts or potential problems. The method may further include generating text or graphical reports providing the analysis reports. The reports may provide risk qualification information by providing information about the relative numbers of binaries in each of the at-risk categories and levels of effort to correct each category. The reports may be generated based on an overall customer system basis, on a binary-by-binary or groups of binary basis, on the basis of a subset of the customer system such as business division, geographic location, data center, and other useful divisions, and on another basis useful for effectively providing impact analysis information.

DETAILED DESCRIPTION OF THE PREFERRED EMBODIMENTS

Briefly stated, the present invention addresses prior problems in analyzing and reporting potential impacts of a software upgrade on a customer system. The present invention provides a method (and underlying tools and devices) to qualify and quantify the impact of a planned software upgrade on existing application and other binaries (e.g., previously engineered and implemented executables) presently being used in the customer computer system or distributed computing environment. The upgrade impact analysis involves creating an "as-is" picture or inventory of the customer system including hardware configurations, application interfaces, implemented software (such as operating system or environment, middleware, independent software vendor products, development tools, applications, and the like), and application libraries and binaries. This metadata from or inventory of the customer system is then analyzed based on rules or information from the planned, new environment (i.e., upgrade rules based on the planned software upgrade or new version) to determine the impact on and/or readiness of the customer system for the planned upgrade.

More particularly, the binaries are screened (such as with the combined or individual use of regression analysis and knowledge management) based on the upgrade rules to classify or categorize the binaries into "safe" or, more accurately, very low risk binaries, i.e., binaries which will operate unaffected within the upgraded system, and binaries that are not classified as very low risk or safe binaries, which can be thought of as "at risk" binaries. The at-risk binaries are further categorized based on known customer priorities and on severities of potential problems that may arise if a binary fails to run perform as expected. In one embodiment, the at-risk binaries are categorized into the following categories: low risk for binaries that are anticipated to be unaffected or to require a relatively low level of effort to correct; high risk for binaries in which the binary may be affected and/or require a higher level of effort to correct; and failure for binaries that are expected to fail to operate after the upgrade and for which at least some effort is known to be required to address a problem. The analysis method typically includes the generation of one or more reports that depict in readily understood fashion the results of the impact analysis (such as by quantifying and qualifying the binaries, providing an indication of risk by system and an indication of level of effort on an overall basis and at a system level, and showing dependencies in graph or tabular form).

Figure 1:
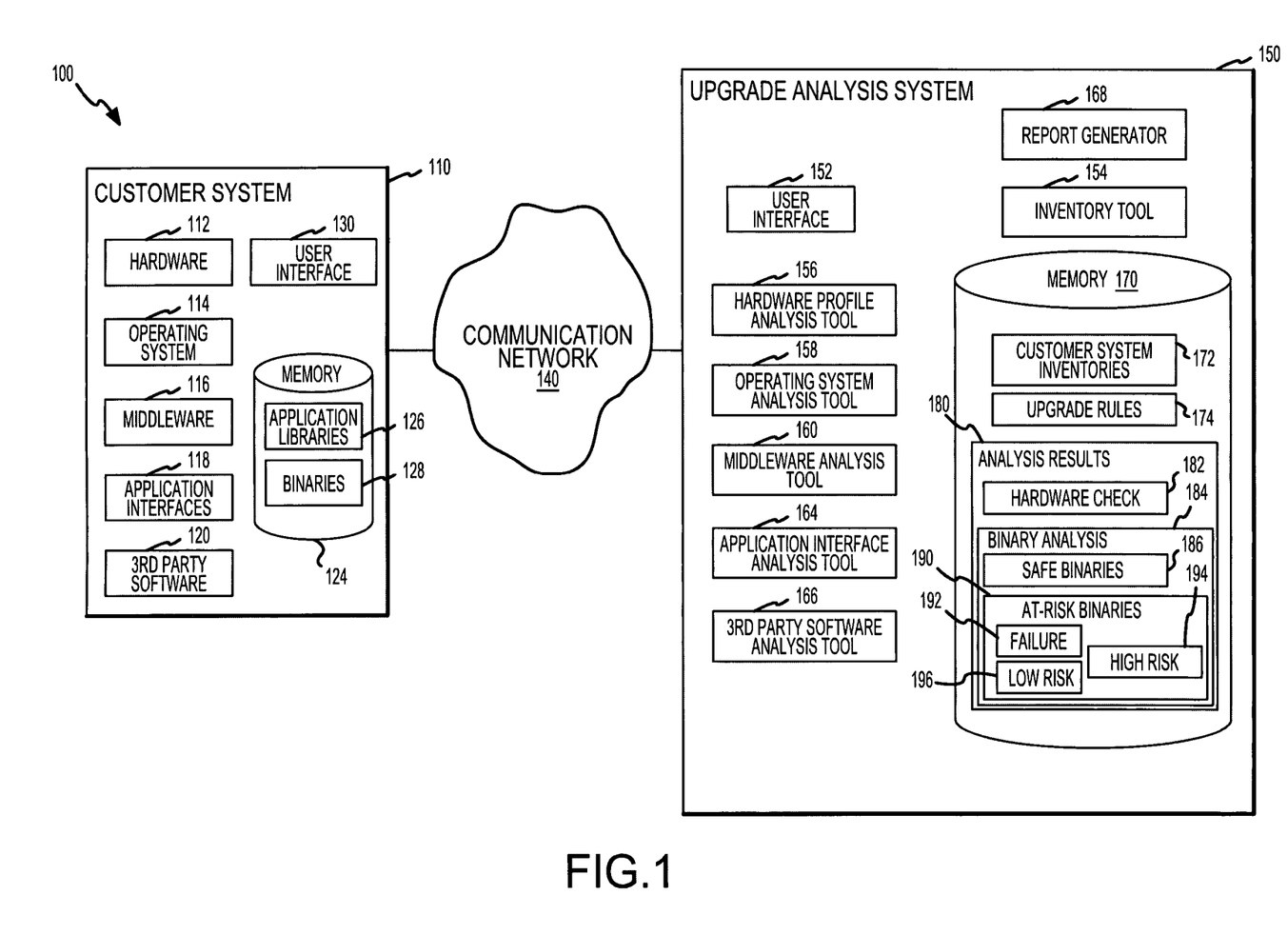
FIG. 1 illustrates a distributed computer system with an upgrade analysis system providing upgrade analysis functions of the present invention to a software customer system.

To provide a better understanding of the present invention, the upgrade impact analysis method or process is described as being provided by an upgrade analysis system to a customer system in a networked computing environment, as shown in FIG. 1. While described in a simplified environment, the method is readily applicable to complex distributed computing environments that could readily include a plurality of interacting customer systems (with one to thousands of computing devices that may be networked and located in geographically diverse areas and grouped into numerous data centers and business functions or divisions), one or more upgrade analysis systems (or analysis and reporting tools or functions spread over one or more computer systems or machines), and one or more communication networks. From the description of the exemplary implementation of an upgrade analysis system, the discussion continues with a more detailed discussion of the upgrade impact analysis method of the invention or operation of the upgrade analysis system with reference to FIG. 2 and discussion of representative reports that may be generated as part of the analysis method with reference to FIGS. 3 and 4. While specific examples of vendor software or hardware technologies may be provided in the following description, these examples are not meant to be limiting as the present invention is not limited to analysis of upgrades by a particular software vendor or even to a particular type or level of software product.

FIG. 1 illustrates one embodiment of a distributed computer system 100 useful for implementing the upgrade impact analysis and reporting features of the invention throughout a computer network. As illustrated, the distributed computer system 100 includes a software customer or client system 110 and an upgrade analysis system 150 that are in communication via the communication network 140 (e.g., the Internet, a LAN, a WAN, and the like) or via other communications links (not shown, or digital data may be transferred by storage on storage media and transfer to and from the customer system 110 and the upgrade analysis system 150). In the following discussion, network devices, such as customer system 110 and upgrade analysis system 150 will be described in relation to their function rather than as particular electronic devices and computer architectures. To practice the invention, the computer devices and network devices may be any devices useful for providing the described functions, including well-known data processing and communication devices and systems such as personal computers with processing, memory, and input/output components, data storage devices and systems, and server devices configured to maintain and then distribute executable code over a data communications network. The communication links, or network 140, may be any suitable data communication link, wired or wireless, for transferring digital data between two electronic devices. Data is typically communicated in digital format following standard protocols, such as TCP/IP, but this is not intended as a limitation of the invention.

The customer system 110 may take many forms and include a wide variety of hardware and software technologies. The customer system 110 is intended to represent an enterprise system found within a typical business entity or organization and, as such, may include one or more data centers, numerous personal computers or workstations linked by networks to one or more application servers, storage devices, and network servers, or nearly any configuration typically found in enterprise systems. The machines of the customer system 110 may be located in one geographic area or spread across numerous geographic sites and may be further divided or organized by business division or enterprise functions. Further, although one customer system 110 is shown for ease of description, the upgrade analysis system 150 generally could support and provide analysis services to numerous customer systems, similar to or differing from system 110.

The customer system 110 includes hardware 112 including one or more CPUs, memory devices (such as disks, tapes, and the like), drivers, communication connections, and other hardware devices. The customer system 110 further includes an operating system to manage operation of the system 110, such as managing libraries (such as application libraries 126 in memory 124), public and private interfaces, and drivers, controlling multitasking, handling input and output to memory devices and peripheral devices, and performing job scheduling. Middleware 116 also is provided to provide an interface(s) between applications on computer system 110 and control programs (such as operating system 114, network control programs and database management systems (not shown)). The customer system 110 includes application interfaces 118 including, but not limited to, application program interfaces (APIs) that are used by applications to communicate with other applications or programs (for example, calls made by an application to the operating system 114, a messaging system, or a database management system (or memory 124)) and application binary interfaces (ABIs) defining machine language of the CPU in the hardware 112, calls between applications and the operating system 114, and other operating characteristics of the system 110.

Applications and third party software 120 operate on the customer system to facilitate data entry, data management, communication, and data display (e.g., any data processing, productivity, or other software program). Development tools (e.g., any software that assists in the creation of machines or software) may be included in the applications and third party software. Memory devices and data structures 124 store data and are accessible by the hardware 112, operating system 114, middleware 116, and applications and third party software 120. Application and other libraries 126 are provided for storing data accessed during operation of the system 110 and static and dynamic links are used by applications and other devices in accessing the application libraries 126. Binaries 128, e.g., executable programs in machine language, for the applications on the system 110 are shown to be stored in the memory 124 with instances, not shown, running on the system 110. Binaries 128 can be costly to build and often represent an important aspect of the customer system 110 for providing function and services. As will become clear, the upgrade analysis system 150 operates to effectively quantify and qualify the binaries 128 and potential impacts of a software upgrade (e.g., an upgrade to a newer version or different product for the operating system 114, for middleware 116, or applications or third party software 120 including development tools) on the customer system 110.

The system 110 applications, operating system 114, middleware 116, and third party software and system applications 120 typically have a version associated with them (the most recent version or an earlier version) and each typically utilizes particular, and often differing, libraries and library links and interfaces (as illustrated as application interfaces 118) and drivers, as appropriate. Together these and other unique features of the hardware 112, operating system 114, middleware 116, and applications and third party software combine to provide a configuration definition or profile for these elements of the customer system 110, which can be captured by the upgrade analysis system 150 and used to determine potential effects of a software upgrade on system 110. The customer system 110 further includes a user interface 130, such as a work station or personal computer with a monitor and browser, for allowing an operator of system 110 to communicate with the upgrade analysis system 150 via communication network 140 to, for example, to request an upgrade analysis and to view analysis result reports generated by the upgrade analysis system 150.

The upgrade analysis system 150 is linked to the network 140 to allow it to receive upgrade analysis requests, to access the customer system 110 to create an inventory of the existing hardware and software on the system 110, and to transmit analysis results or reports to the customer system 110. The upgrade analysis system 150 functions to analyze the metadata in the inventory to create sets of analysis results which effectively quantifies and qualifies (e.g., categorizes into useful and understandable subsets) risks and impacts of an upgrade on the system 110 and particularly on the hardware 112, the operating system 114, the middleware 116, the third party software and applications 120, and, particularly, on previously built binaries 128. This analysis method is explained in detail with reference to FIGS. 2–4 along with the operation of the upgrade analysis system 150 and its tools.

To perform upgrade impact analysis, the upgrade analysis system 150 includes a user interface 152, such as a workstation or personal computer with input and output devices, for allowing a user of the system 150 to interface with the analysis tools and to view analysis results and reports. A key portion of the upgrade impact analysis is accurately defining the existing customer system 110. In this regard, the system 150 includes an inventory tool 154 which functions to access the customer system 110 via the network 140 and to gather configuration information on the hardware 112, the operating system 114, the middleware 116, the application interfaces 118, the applications and third party software 120, the memory 124 including application libraries 126 and binaries 128, and other hardware and software aspects of the system 110 not shown. This metadata is stored in the memory 170 as a customer system inventory 172 for customer system 110. The customer system inventory 172 provides a detailed definition or profile of the Application Program Interfaces (APIs), Application Binary Interfaces (ABIs), hardware and software configurations (including versions, libraries and links, drivers, clustering, and the like), and binaries. The inventory 172 for system 110 may be used by the report generator 168 to create inventory reports including a total inventory report, a serial number and physical location report, system profile report, CPU report, disk report, disk model report, disk partition report, file system report, system packages or applications reports, patch reports, and the like.

The inventory 172 typically includes a very large volume of data for each system 110 to adequately define the current profile of the system 110. For example, in a typical customer system 110, such as a data center or enterprise system, the number of server or other computing devices in hardware 112 may range from a few to 50 or more and the binaries 128 may number from a few hundreds to a few thousand up to and exceeding tens to hundreds of thousands of binaries. As will be understood, the size and complexity of a typical customer system 110 leads to a customer system inventory or gathered configuration metadata that by itself is unmanageable and overwhelming for use as an upgrade analysis tool without further processing to better characterize the information and determine the affect of a planned upgrade on the existing configuration profile or inventory 172 of system 110.

To allow this further processing, the upgrade analysis system 150 stores in memory 170 (or retrieves from a storage device on the network 140 or otherwise) upgrade rules 174 for the planned upgrade. The upgrade rules 174 will vary significantly depending on the planned upgrade but generally define a new or upgrade environment for the customer system 110 after the upgrade and rules that are required or recommended to be followed to make the transition or move to the new environment. For example, the upgrade rules 174 may be relatively complex for a move from one to another operating system 114 but less complex for a move from one to another middleware 116 or application or third party software 120.

According to an important aspect of the invention, the upgrade analysis system 150 is configured to categorize the customer system 110 for analysis as shown in FIG. 1 into hardware 112, operating system 114, middleware 116, application interfaces 118, applications and third party software 120, and binaries 128. In this manner, profile information is gathered on these hardware and software categories and then each of these categories is individually and in combination analyzed by the system 150. The upgrade rules 174 define profiles or configurations (such as dependencies, libraries, hardware capabilities and settings, and the like) for the hardware 112, the operating system 114, the middleware 116, the applications and third party software 120, and the binaries 128. The upgrade rules or definition of the upgraded system 174 are used by the system 150 to compare the existing system 110 as defined by the inventory 172 with the planned system 110 to identify affects or impacts of the upgrade, to find potential trouble spots, to define risks, to create recommended corrective actions, and to determine levels of effort to implement corrective actions.

To this end, the upgrade analysis system 150 includes one or more analysis tools that can be used sequentially or concurrently to compare the existing customer system 110 with the planned upgraded system by using the upgrade rules 174 and to create and store analysis results 180 in memory 170. As shown, a hardware profile analysis tool 156 is provided to process the profile of the hardware 112 in the customer system inventory 172 against the upgrade rules 174 pertaining to hardware requirements for the planned software upgrade. The hardware profile analysis tool 156 may perform a hardware check of the memory 124, of disks, of tapes, of drivers, of communication setting and capacities such as bus size, and of other elements of hardware that may be required or recommended to support the proposed software update. The results of the hardware profile analysis are stored as hardware check 182 in memory 180 for later accessing by report generator 168 and/or user interfaces 130, 152.

Similarly, an operating system analysis tool 158 is provided to process the inventory or profile of the operating system 114 against the upgrade rules 174 and to create analysis results 180. Such comparison may include among other comparisons a comparison of operating system version, private and public interfaces, drivers (and versions), bus requirements and settings, and libraries. A middleware analysis tool 160 and a third party and application software analysis tool 166 are provided to process the middleware 116 and third party application software 120 profiles in the inventory 172, respectively, against or with the upgrade rules. Again, the rules 174 typically will indicate one or more acceptable versions, expected APIs, libraries, and the like to enable the middleware 116 and applications and software 120 to operate without problems within the planned upgrade environment of the customer system 110. The results of the analysis are again stored in the analysis results 180 for later access by the report generator 168 and/or interfaces 130, 152.

According to another important feature of the invention the binaries 124 are analyzed to quantify the binaries and to quantify anticipated impacts of a planned software upgrade on the binaries 124. Analysis of the binaries 128 in the inventory 172 are processed against the upgrade rules 174 by one or more tools in the system 150. The binary analysis results 184 are stored in the memory 170. Based on the analysis, the binaries 128 are quantified by total binaries and then categorized or divided into groups based upon the expected impact of the upgrade, based on a risk of impact, and/or based on the severity of the impact, the level of effort to correct the binary, and/or the importance of the binary to the operation of the customer system 110 (which may be based on which portion of the system 110 the binary 128 is operating, for which application the binary 128 was built, or based on other factors).

As shown, the binaries 128 are classified as either safe binaries 186 which are expected to be compatible with the software upgrade or at-risk binaries 190 (e.g., binaries that have a higher risk than the safe or very low risk binaries 186 and can be thought of as "at-risk" binaries) which are, based on the analysis, expected to be impacted by the software upgrade or which are not readily classified as very low risk. Because the number of at-risk binaries 190 may be quite large and unwieldy (e.g., an exemplary system with 84,000 binaries for one upgrade impact analysis was found to contain more than 20,000 at-risk binaries for a planned software upgrade), the upgrade analysis system 150 preferably further qualifies the at-risk binaries 190 into additional subset that facilitate the determination of whether to proceed with a software upgrade based on return on investment (ROI), return on assets (ROA), total cost of ownership (TCO), and other financial and technical considerations.

As illustrated, the at-risk binaries 190 are further divided into three subsets or categories. A failure binary set 192 is provided to contain binaries 128 that based on the upgrade rules 174 are expected to fail to operate after the upgrade and modification or correction being required, with failure being indicated by such things as inclusion of obsolete libraries 126, improper data paths or links, obsolete APIs or ABIS, and the like. A high risk binary set 194 is provided to contain binaries 128 that have the possibility of running after an upgrade without modification. High risk binaries 194 may also include binaries for which a higher importance to the customer system 110 is placed or for which a higher level of effort to correct or modify the binary 194 is required. A low risk binary set 196 is provided to contain binaries 128 for which it is determined that the upgrade will most likely not affect the running of the binary 128 or for which any modifications will take minimal levels of effort to correct or for binaries 128 that are of relatively low importance to the customer system 110.

An application interface analysis tool 164 is provided to analyze the application interfaces 118 as defined in the inventory 172 against the upgrade rules 174 with the results being stored in the analysis results 180. The compatibility of many binaries 128 with a planned upgrade is often defined or determinable based on the interfaces of the binary 128 (e.g., whether the binary 128 was built in compliance with a particular API or ABI) with other applications and programs. Hence, the application interface analysis tool 164 in some embodiments performs much or all of the binary analysis and generates the binary analysis results 184 discussed above.

According to another important feature of the invention, the upgrade analysis system 150 is configured to process and then present the analysis results 180 in a manner that is useful and readily understood by operators of the system 150 via user interface 152 or by operators of the customer system 110 via user interface 130 (e.g., as displays or pages on a monitor, as hard copies from a printer, and the like). From the analysis results 180, the report generator 168 is able to present directly or with further manipulation risk of the upgrade at a system level, level of effort resulting from the upgrade at a system level, and dependencies (e.g., time lines, hardware dependencies and requirements, operating system dependencies, application dependencies, and more). These captured results can be displayed in simple text or tabular form or may be provided graphically. Further, in some embodiments, the report generator 168 functions to aggregate the analysis results on a system level, on a data center level, on a geographic basis, on a business group level, and based on ROI, ROA, and/or TCO. The aggregated results can be displayed in graphs utilizing a number of differing scales for the x and y axes to better show the risk, level of effort, and other impact factors to a user (such as at user interfaces 130, 152). For example, logarithmic/natural log scales may be used, logarithmic/integer scales may be used, and/or logarithmic/logarithmic scales may be used to graph the analysis results in a user friendly and readily understood fashion.

The tools 154, 156, 158, 160, 164, 166 and report generator 168 are illustrated as separate devices (such as software programs, objects, and the like). In other embodiments, a single analysis tool is provided to provide the functions of these tools. In another embodiment, two or more tools are provided to combine two or more of the tools to provide the described analysis functions. Similarly, although shown within a single system 150, such as on an application server, the tools 154, 156, 158, 160, 164, 166, report generator 168, and memory 170 may be provided on a plurality of servers, computer devices, and storage devices that may or may not be linked by communication networks (such as network 140, a LAN, or a WAN). Further, the particular programming language used to implement the features of the system 150 are not limiting to the invention.

Figure 2:
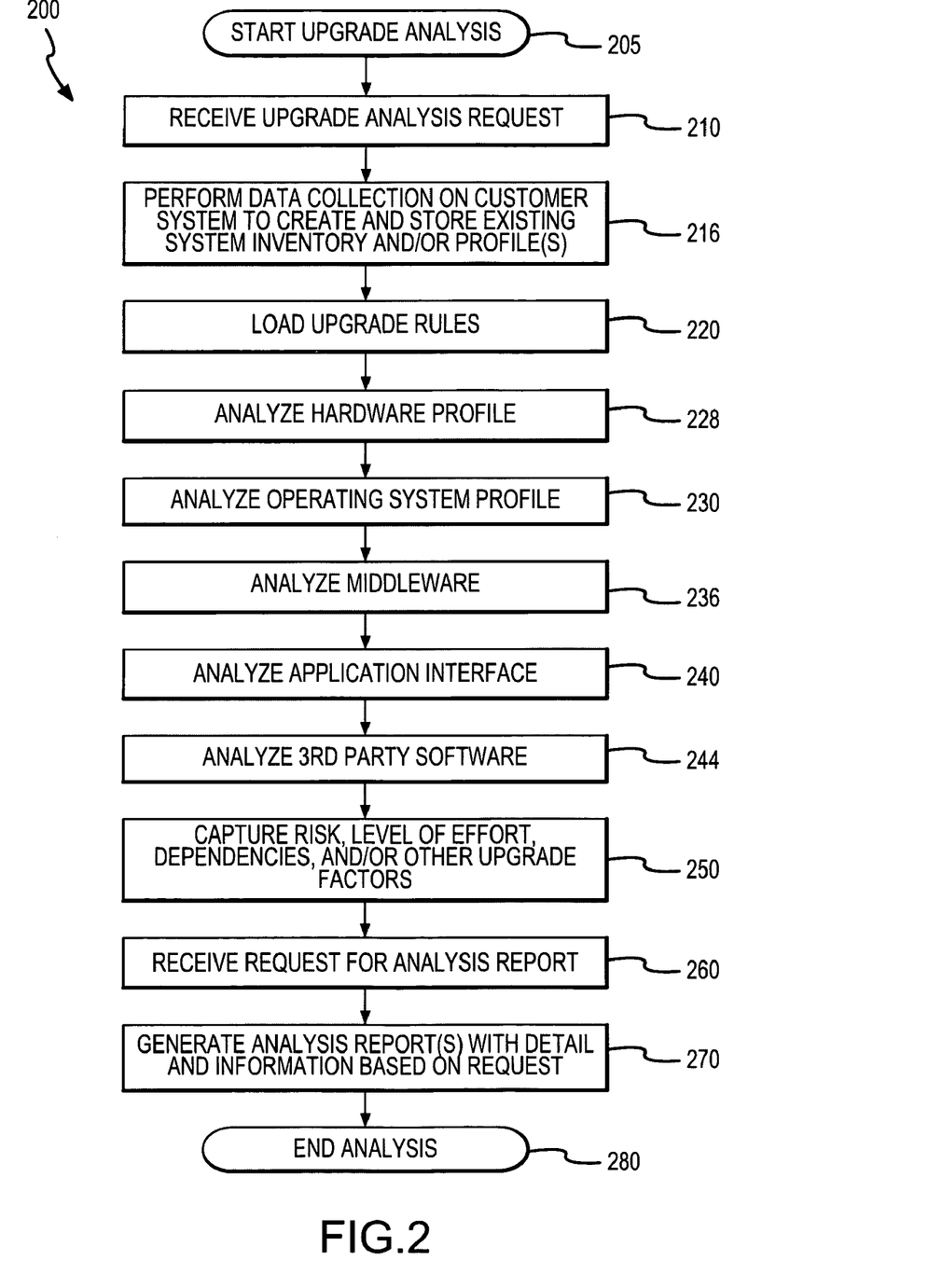
FIG. 2 is a flow chart showing generally actions taken in performing an upgrade analysis of a customer system or portion of a customer system.

FIG. 2 illustrates an upgrade analysis 200 performed according to the present invention. At 205, the upgrade analysis 200 is started which may include establishing an upgrade analysis system 150, linking the system 150 to the network 140, and initially contacting and/or providing access to the customer system 110. At 210, an upgrade analysis request is received at the upgrade analysis system 200 from the user interface 152 (when the analysis is initiated by an analysis system 150 operator) or from customer system 110 via user interface 130 and network 140. Typically, the analysis request will specify the software product that is planned for installation and its version. The analysis request may further indicate mission critical applications and/or binaries that preferably are unaffected by the upgrade or that are given higher priority or value in determining the risk of the upgrade.

At 216, the upgrade analysis system 150 collects data from the customer system 110 to create and store an existing system inventory (or profile) of the existing software and hardware. As part of the data collection 216, information is collected for the binaries 128 and/or on each machine in the system 110. The binary information in the inventory 172 generally includes all information useful for determining the compatibility of the binary 128 with the proposed software upgrade (based on upgrade rules 174 or otherwise determined) and may include dependencies, interfaces, utilized symbols/languages, libraries linked with the binary 128, and the like. At 220, the upgrade rules 174 are loaded into memory 170 or accessed for use by the system 150. As discussed above, the upgrade rules 174 are particular to the software being upgraded and are useful for defining the new customer system 110 environment (e.g., the post-upgrade hardware and software configuration of the customer system 110).

At 228, 230, 236, 240, 244, the inventory or current system configuration is analyzed against the new or planned upgraded system based on upgrade rules 174 and the analysis results 180 are created and stored in memory 170. Specifically, the hardware profile analysis tool 156 is used to check the existing hardware profile in inventory 172 to determine the readiness of the hardware 112 for the software upgrade and the hardware check results 182 are stored in memory 170. The operating system analysis tool 158 is used at 230 to process the inventory 172 based on the upgrade rules 174 to determine the readiness or compatibility of the operating system 114 with the software upgrade. The results are stored in the analysis results 180 and may indicate problems with libraries, interfaces, drivers, bus size, and other hardware characteristics. Middleware analysis tool 160 is used at 236 to analyze the inventory or profile of the middleware 116 for impact and risk based on the upgrade rules 174 and the results stored in analysis results 180.

At 240, application interfaces 118 and binaries 128 are analyzed with application interface analysis tool 164 to determine impact on existing binaries 128 of the planned software upgrade, again based on the upgrade rules 174. As discussed above, the binaries 128 are first divided into very low risk 186 and at-risk binaries 190 for operation after the upgrade. The at-risk binaries 190 are further classified as failure binaries 192, high risk binaries 194, and low risk binaries 196 based on the likelihood of unaffected operation after the upgrade, based on the priority or importance of the binaries, and/or potential level of effort anticipated for correcting the binary 128. At 244, applications and third party software 120 is analyzed with tool 166 based on the upgrade rules 174 and the results stored in analysis results 180.

At 250 (or concurrently with steps 228–244), the analysis system 150 acts to capture risk of the upgrade, anticipated level of effort to modify the system 110 to comply with the upgrade, dependencies, and/or other impact considerations. The risk and level of effort may be quantified and/or generally related to the quantification and qualification of the binary impacts (as discussed below for report generation 270) and may be provided on a system level, on a machine basis, on a data center basis, or some other user definable division of the customer system 110. The dependencies can be provided on a system level or based on a useful division of the system 110.

At 260, a request is received for one or more analysis reports from the user interface 152 or from the customer system 110. Prior to step 260, a graphical user interface may be generated by the upgrade analysis system 150 presenting a menu of graph or report choices that can be requested and which are generated by report generator 168. Preferably, the report generator 168 is configured to support the production and transmission of numerous reports based on the analysis results including but not limited to text reports and graphs. At 270, the report generator 168 responds to the request by generating one or more requests based on the request and, typically but not necessarily, transmitting the report to the requester, such as to user interface 130, 152. At 280, the analysis 200 is ended.

The type or form of the report may be a text report that provides recommended corrective actions to perform prior to the upgrade along with levels of effort, which is particularly useful for hardware 112, operating system 114, middleware 116, and application and third party software impacts or incompatibilities. The text report may also quantify the impact on the binaries 128 by providing a total number of binaries 128, a number of very low risk binaries 186, and a number of at-risk binaries 190 preferably along with a quantification and qualification of the at-risk binaries 190 by providing a total count of failure binaries 192, high risk binaries 194 and low risk binaries 196.

Figure 3:
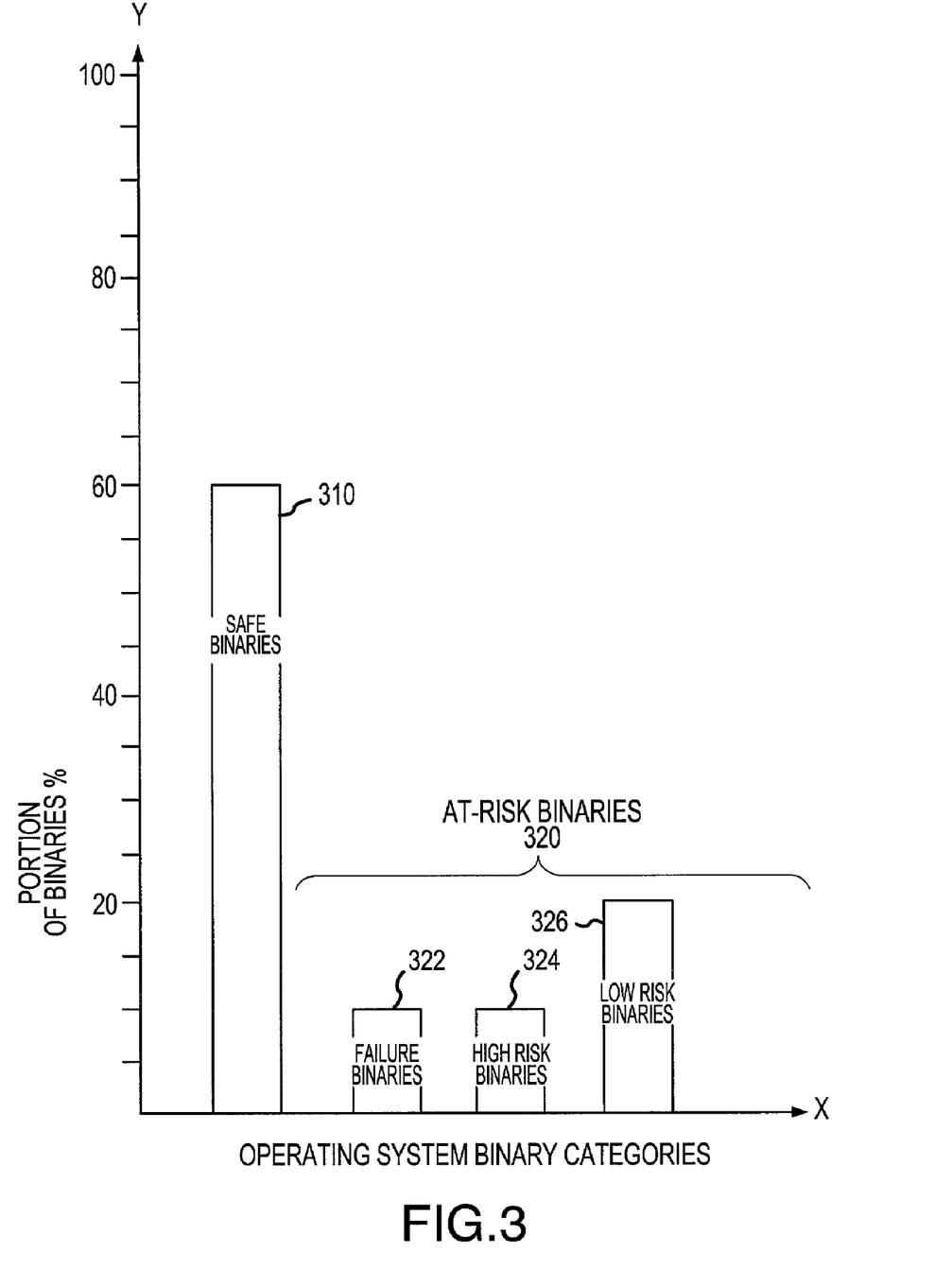
FIG. 3 is a bar graph showing one embodiment of an analysis report created by the upgrade analysis system tools of FIG. 1 and illustrating the quantification and qualification of binaries during operating system analysis.

A bar graph, such as the graph shown in FIG. 3, may also be used to visually illustrate the level of risk of performing the upgrade. As shown in FIG. 3, the binaries (and particularly the operating system binaries) are shown by category as bars along the x-axis while the portion of the total binaries by percent is provided along the y-axis. As illustrated, the safe binaries 310 are 60 percent of the total binaries while the at-risk binaries 320 make up the 40 percent of the binaries. The bar graph is of FIG. 3 is useful for not only quantifying the binaries but also qualifying the risk by providing the percentage of the binaries in each category 322, 324, 326. By showing the percentage of the binaries 128 in each category the operator or viewer can more readily understand the overall risk of the upgrade. For example, a large percentage of low risk binaries 326 may not cause a large concern for a customer system operator while a larger percentage of failure binaries 322 and/or high risk binaries 324 may indicate that a large level of effort or unacceptable downtime may occur if corrective actions are not taken (such as updating binaries 128) prior to the planned upgrade. The graph shown in FIG. 3 can be provided for an individual machine, for groups of machines or portions of the system 110 (such as a business division, a geographic regions, and the like) or on a system-wide level.

The textual reports can include a listing of dependencies determined and indicate which dependencies may be improper or obsolete after the upgrade (as may be defined in the upgrade results 174). The textual reports may further provide an indication of level of effort required to correct binaries, to correct dependency issues, and/or to correct other identified issues. The binaries may be shown on an individual basis from the binary analysis 184 and particularly the at-risk binaries 190. For example, listings of the failure binaries 192 and the high risk binaries 194 along with related information (such as libraries, interfaces, and other useful information for modifying or correcting the binaries) to allow a user to take corrective actions. These binaries 190 can be listed by system, by enterprise, by business division, or by other useful division of the customer system 110.

Figure 4:
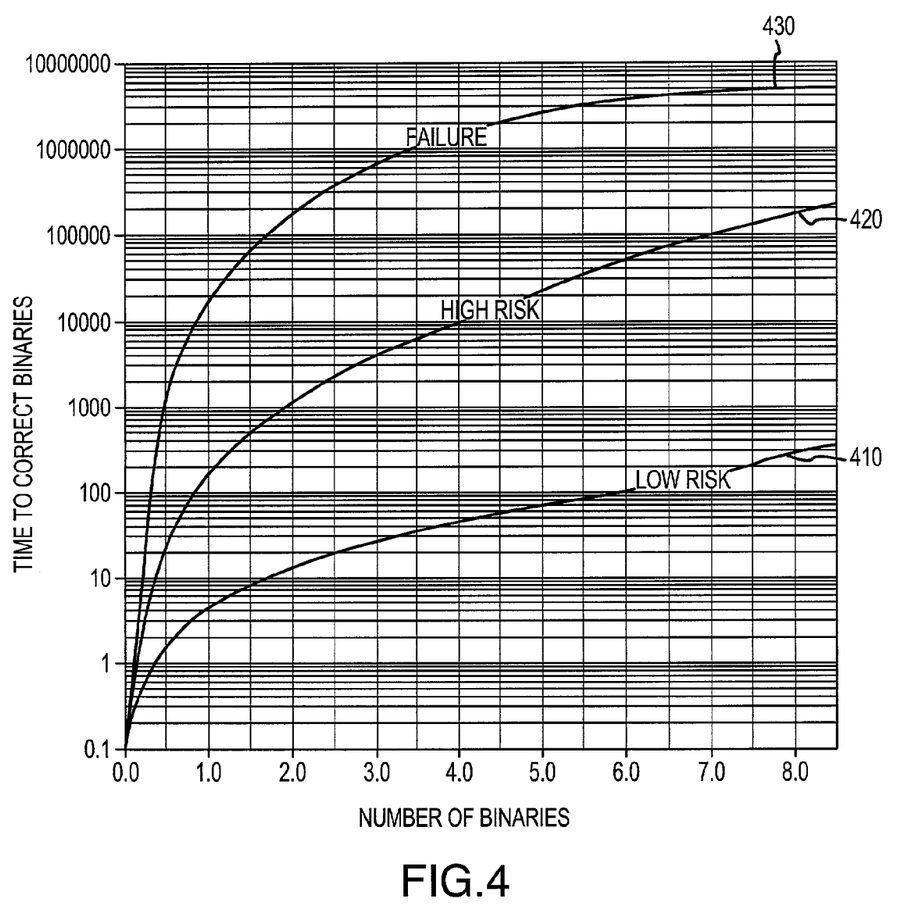
FIG. 4 is a graph with a logarithmic scale showing representative levels of efforts to solve or correct various categories of at-risk binaries.

The report generator 168 further operates, at least in some embodiments, to generate graphs that visually represent the analysis results. For example, the level of effort may be better understood when graphed as shown in FIG. 4. A logarithmic scale is used on the y-axis to illustrate the time to correct binaries in minutes with a number of binaries in thousands on the x-axis. The categories of binaries that are impacted by the software upgrade and that may require a level of effort are shown as a low risk curve 410, a high risk curve 420 and a failure curve 430. As shown, a larger number of failure and/or high risk binaries may require a large level of effort while low risk binaries represented by curve 410 do not require a large level of effort even when larger numbers of such binaries are identified. In other embodiments, these graphs aggregate the analysis results 180, such as by showing binary analysis 190, on a system level, on a data center level or other useful division of customer system 110, or to highlight ROI, TCO, and/or ROA. These graphs may utilize logarithmic/natural log scales, logarithmic/logarithmic scales, or other useful x and y-axis scales for displaying the analysis results 180 (and particularly for showing risk and level of effort).

Figure 5:
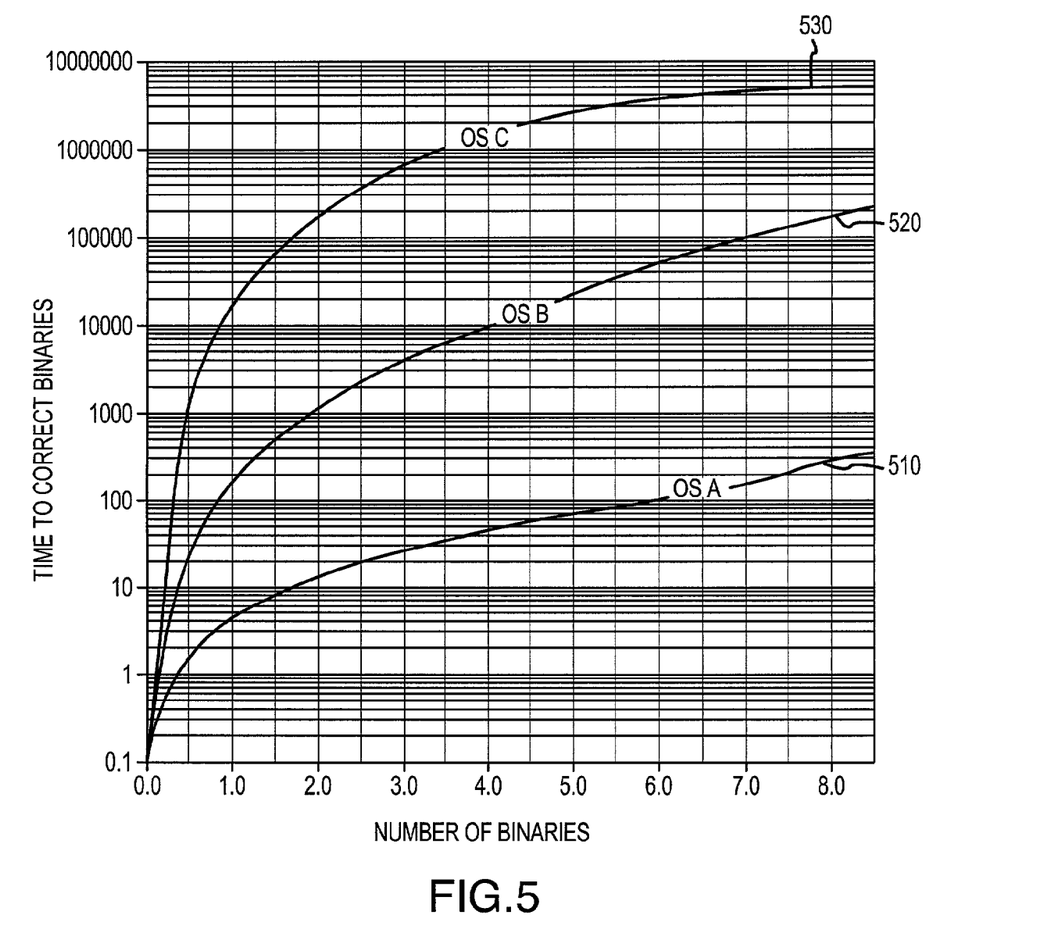
FIG. 5 is a graph similar to FIG. 4 showing representative levels of efforts to solve or correct binaries in upgrades to three different operating systems.

For example, the report generator 168 may generate the graph shown in FIG. 5, which utilizes similar xaxis and y-axis scales and compares the time to correct binaries to the number of binaries identified in the customer system 110 (or a portion thereof). In FIG. 5, the graph provides curves representing an impact of a planned upgrade on different operating systems (e.g., operating system 114 in FIG. 1 may actually represent a plurality of systems on the customer system 110) as shown by "OS A" curve 510, "OS B" curve 520, and "OS C curve 530. As can be seen, the planned upgrade is higher risk or requires a higher relative level of effort for operating system C than operation system A and B. Typically, such comparison assumes similar development tools, middleware, and applications are utilized with each operating system (although this is not required).

Figure 6:
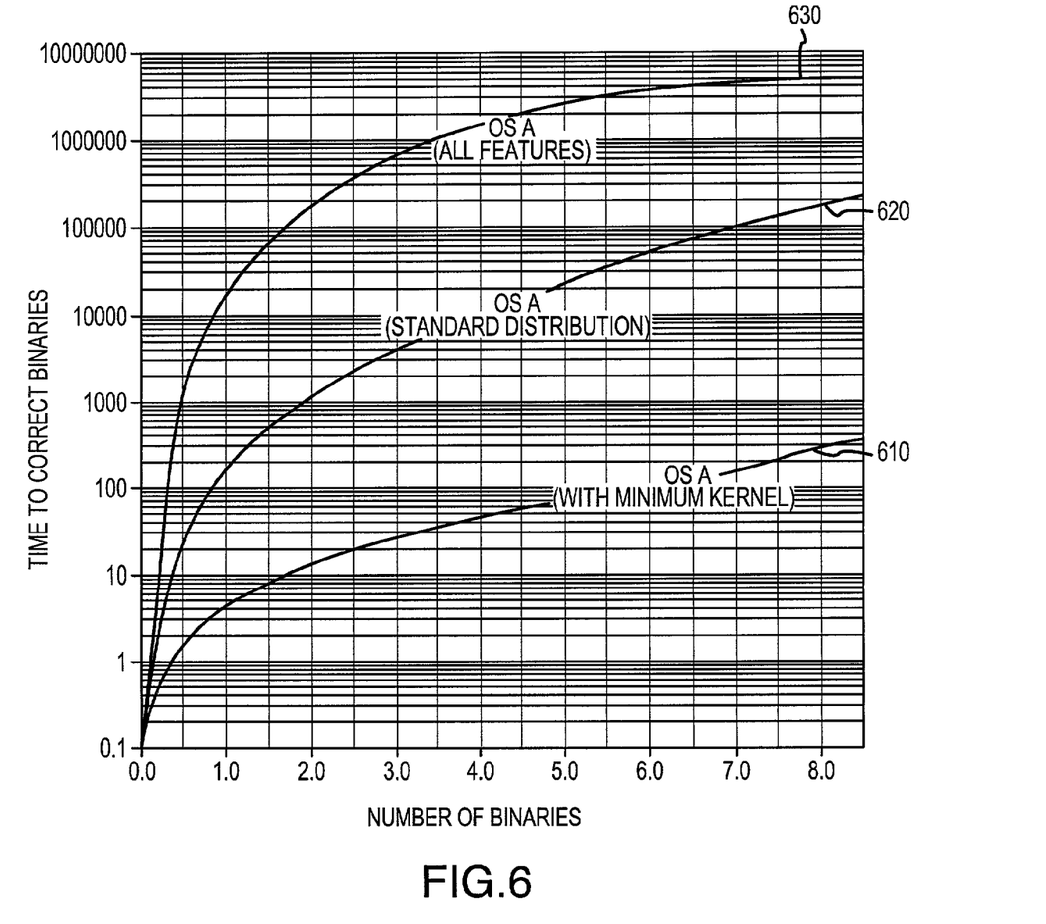
FIG. 6 is a graph similar to FIG. 4 showing representative levels of efforts to perform an upgrade on one operating system but at differing levels of upgrade complexity.

FIG. 6 provides another graph similar to FIGS. 4 and 5 but illustrating with curves 610, 620, 630 the potential impact of upgrading to three differing configurations or implementations of any vendor-supplied operating system or environment. This comparison is useful for quickly and visually showing the differences in impact of upgrading operating system and, particularly, upgrading to a particular implementation of such operating system. Any vendor's operating system or environment can be analyzed in this fashion. As shown with curves 610, 620, 630, the level of effort or the amount of impact on a customer system 110 or a portion of such system 110 increases with the complexity of the operating system implementation (e.g., the planned software upgrade). As shown (for a particular operating system), curve 610 represents the level of effort for a minimum kernel operating system upgrade, curve 620 represents the level of effort for a standard distribution operating system, and curve 630 represents the level of effort for a more complex or all features operating system upgrade.

Figure 7:
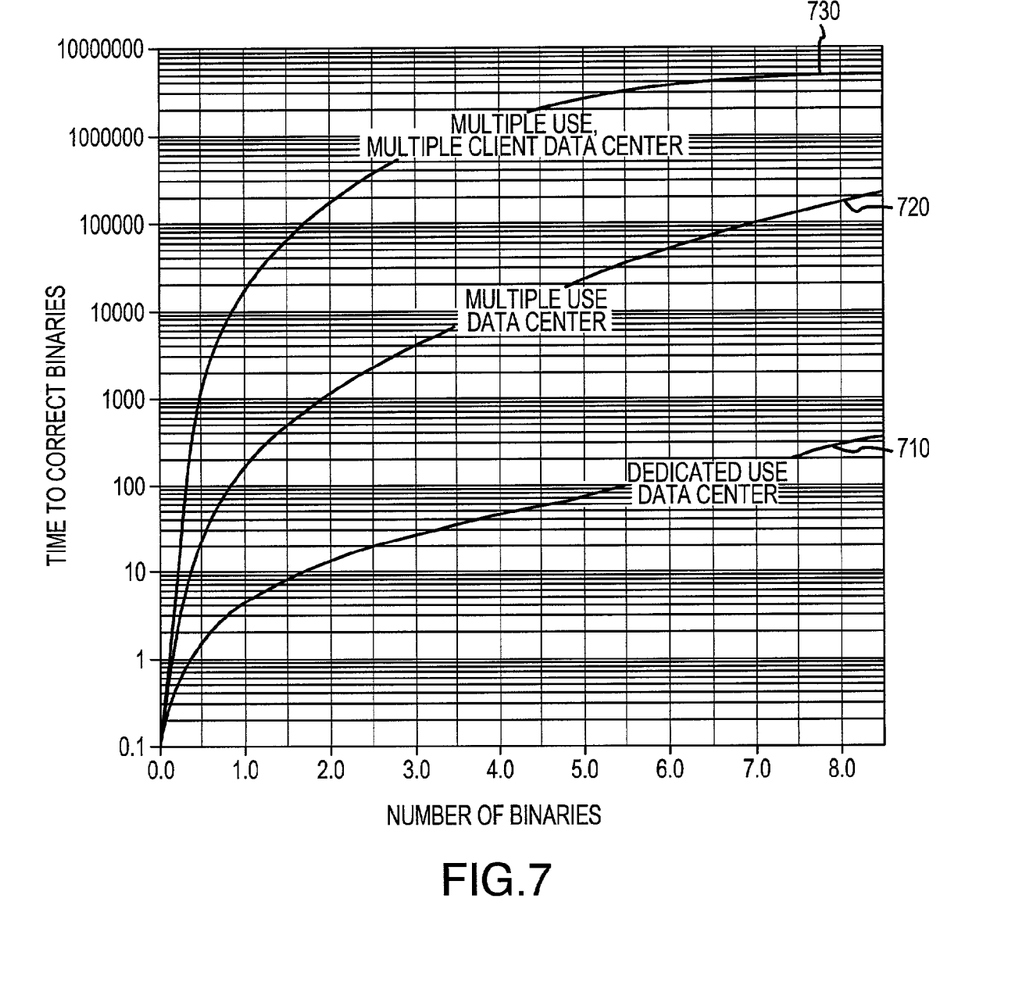
FIG. 7 is another graph similar to FIG. 4 showing representative levels of effort to perform an upgrade on a system level based the complexity of the system and/or upgrade planned.

FIG. 7 again compares risk and resources based on differing levels of complexity of a particular system (such as customer system 110 or a portion of system 110). A planned software upgrade generally has a greater impact on more complex computer systems that provides more functionality and each customer system 110 may include systems, networks, and the like with differing complexity and as such, an upgrade may make business and technical sense for some portions of a customer system 110 but not for all. In FIG. 7, levels of effort for a planned upgrade are provided for three data centers with different complexities. As shown, the risk or required resources for a planned upgrade are represented by curve 710 for a dedicated use data or simple data center, by curve 720 for a multiple use or more complex data center, and by curve 730 for a multiple use, multiple client data center. Of course, similar curves may be provided for systems other than data centers to enable an upgrade decision maker to quickly compare impacts of a planned software on their customer system 110.

In some situations, it is useful to use financial metrics to illustrate the impact of a planned software upgrade, and particularly, to provide a before and after picture of a particular customer system 110 (i.e., at the enterprise level), of a portion of the system 110, or of an individual system in the customer system 110. Numerous financial metrics may be compared in such a graph including, but not limited to, return on investment (ROI), return on assets (ROA), total cost of ownership (TCO), and the like. The particular scales used on the x-axis and the y-axis may also be varied, and in one embodiment of the invention, a logarithmic scale is used for both axes.

Figure 8:
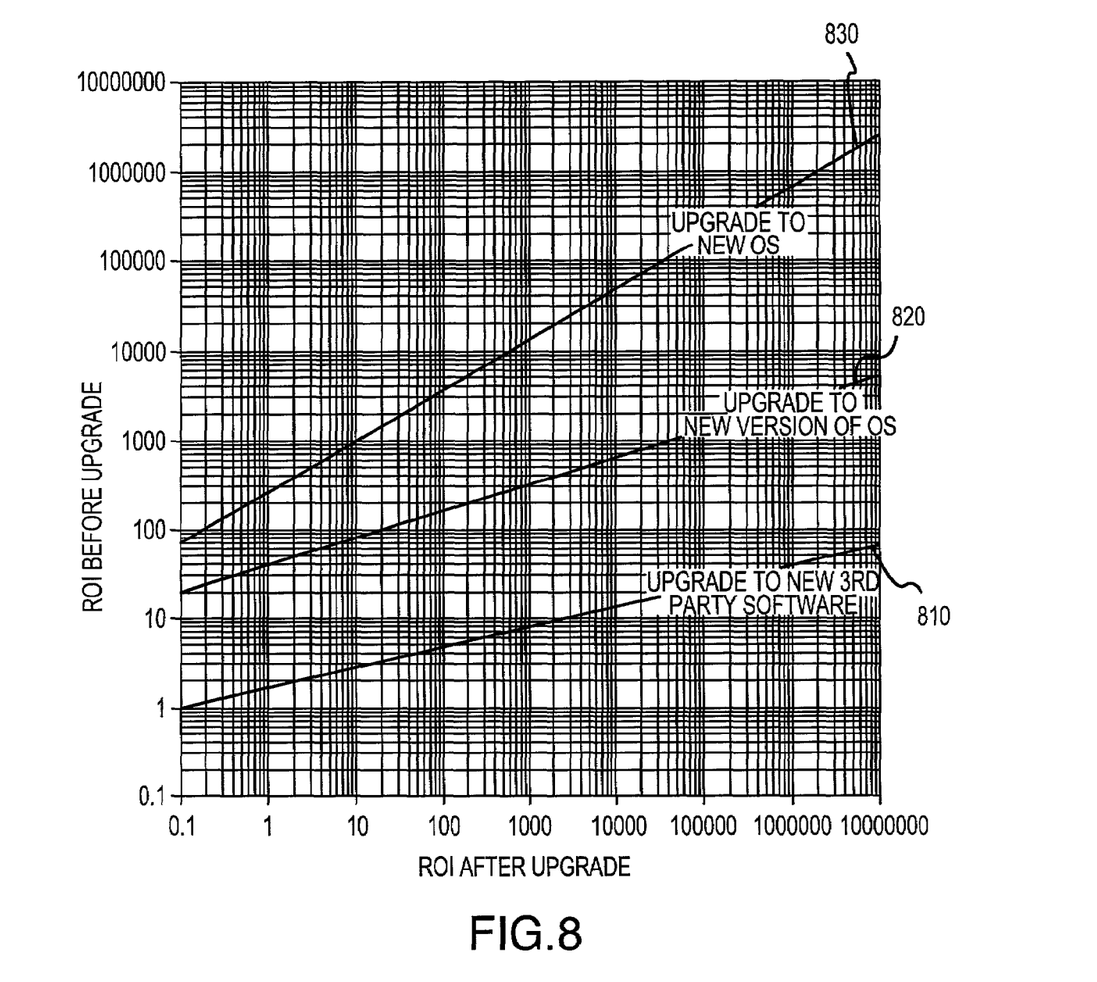
FIG. 8 is a graph with a logarithmic/logarithmic scale showing the comparison of financial metrics (such as return on investment) before and after an upgrade at an enterprise, a business division, data center, individual system, or other level for differing complexity upgrades.

As an illustration, FIG. 8 compares the ROI of an enterprise system, a portion of a system, or an individual system before and after three planned upgrades (although any number of upgrades could be compared). The planned upgrades shown are an upgrade to a new or new version of a third party or other software at 810, an upgrade to a new version of an operating system at 820, and an upgrade to a new or different operating system 830. By comparing financial metrics for a planned upgrade, a decision maker is quickly able to see the financial impact of a planned upgrade (with a positive slope of lines 810, 820, 830 indicating an improved ROI or other metric for the upgrade and a negative slope for lines 810, 820, 830 indicating a decrease in the compared financial metric).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the number of categories used to group and compare the at-risk binaries can be any useful number, such as 2, 3 (as shown), 4, 5, or more. Similarly, the graphs in FIGS. 4–8 can readily be expanded to compare fewer or greater numbers of upgrade impacts, such as by including additional systems, additional operating system implementations, and the like.

We claim:

1. At least one computer-readable medium containing a computer program product for providing a user an analysis of an impact on binaries of a computer system caused by a planned software upgrade, the computer program product comprising:

program code for accessing a configuration inventory of the computer system including a metadata profile for each of the binaries;

program code for accessing a set of upgrade rules for the planned software upgrade;

program code for analyzing the binary metadata profiles based on the upgrade rules wherein analyzing comprises determining whether each binary metadata profile is a safe binary or an at-risk binary, and dividing the binaries into a set of safe binaries and a set of at-risk binaries, wherein the set of at-risk binaries are further subcategorized based on risk of incompatibility of the at-risk binaries with the planned software upgrade; and program code for providing the user a report concerning the planned software upgrade.

2. The computer program product of claim 1, wherein the subcategories include a failure category for the at-risk binaries determined during the analyzing to be incompatible with the planned software upgrade.

3. The computer program product of claim 1 wherein the subcategories include a high risk category for the at-risk binaries determined during the analyzing to have a low probability of running after the planned software upgrade and a low risk category for the at-risk binaries determined during the analyzing to have a high probability of running after the planned software upgrade.

4. The computer program product of claim 1 wherein the report groups the binaries into various functions and risk categories and compares the grouped binaries to a total number of binaries.

5. The computer program product of claim 4, wherein the report is in graph form and includes a representation of each of the subcategories of the at-risk binaries.

6. The computer program product of claim 1, wherein the analyzing further includes determining a level of effort for modifying one of the subcategories of the at-risk binaries to make the binaries in the one subcategory compatible with the planned software upgrade.

7. The computer program product of claim 6, further including generating a list of recommended processes to perform the modifying.

8. The computer program product of claim 1, wherein the configuration inventory includes a hardware profile for the computer system and further including analyzing the hardware profile based on the upgrade rules to create hardware check results.

9. The computer program product of claim 1, wherein the configuration inventory includes a profile of software on the computer system and further including analyzing the software profile based on the upgrade rules to create software analysis results indicating compatibility of the computer system software with the planned software upgrade.

10. The computer program product of claim 9, wherein the software profile comprises subcategories selected from the software groups consisting of operating system or environment software, development tools, middleware, and applications.

11. The computer program product of claim 10, wherein an analysis tool is provided for each of the subcategories for analyzing the subcategories based on the upgrade rules to create impact analysis results indicating compatibility of the subcategory with the planned software upgrade.

12. The computer program product of claim 1, wherein the analyzing includes comparing application interfaces of the computer system profiled in the configuration inventory with the upgrade rules.

13. At least one computer-readable medium containing a computer program product for providing a user an analysis of a planned software upgrade for a customer computer system, the computer program product comprising:

program code for collecting hardware and software configuration data from the customer computer system including a hardware profile and an operating system profile wherein the software configuration data includes metadata profiles for binaries on the customer computer system;

program code for providing upgrade rules for the planned software upgrade;

program code for comparing the hardware profile with the upgrade rules to determine hardware compatibility with the planned software upgrade;

program code for comparing the metadata profiles for binaries with the upgrade rules and based on the comparison of the metadata profiles for binaries with the upgrade rules classifying the binaries as safe binaries or at-risk binaries, wherein the classifying includes classifying the at-risk binaries into two or more subsets based on a determined risk of failure to run the planned software upgrade;

program code for comparing the operating system profile with the upgrade rules to determine operating system compatibility with the planned software upgrade; and program code for providing the user an upgrade analysis report based on the hardware compatibility and the operating system compatibility.

14. The computer program product of claim 13, wherein the report generating includes providing graphical or text information on the subsets.

15. The computer program product of claim 14, wherein the risk is determined based on priorities assigned to the binaries.

16. The computer program product of claim 15, wherein the hardware and software configuration data includes profiles for middleware and applications and further including comparing the middleware and applications profiles to the upgrade rules to determine middleware and applications compatibility with the planned software upgrade.

17. The computer program product of claim 14, further including determining a level of effort for each of the subsets and wherein the report generating includes providing graphical or text information on the levels of effort for the subsets.

18. The computer program product of claim 14, wherein the subsets include a failure category, a high risk category, and a low risk category.

19. The computer program product of claim 13, further including receiving a request from the customer computer system for the analysis indicating software on the customer computer system to be included in the planned software upgrade.

20. A computer system for analyzing an impact of a software upgrade on a customer computer system, comprising:

a data storage device storing a configuration inventory for the customer computer system including metadata profiles binaries on the customer computer system;

a data storage device storing upgrade rules for the software upgrade; and an analysis tool processing the metadata profiles on binaries based on the upgrade rules to classify the binaries into a set of safe binaries and a set of at-risk binaries, the set of at-risk binaries including subsets of binaries differentiated based on a level of risk of incompatibility with the software upgrade.

21. The computer system of claim 20, wherein the subsets of binaries include a failure subset, a high risk subset, and a low risk subset.

22. The computer system of claim 20, wherein the configuration inventory includes a hardware profile, the computer system further including an analysis tool processing the hardware profile based on the upgrade rules to create a hardware check.

23. The computer system of claim 20, wherein the configuration inventory includes an operating system profile, the computer system further including an analysis tool processing the operating system profile based on the upgrade rules to determine compatibility of an operating system of the customer computer system with the software upgrade.

24. The computer system of claim 20, further including a report generator generating reports including text or graphical representations based on the subsets of binaries.

25. A computer system for analyzing an impact of a planned software upgrade on a customer computer system, comprising:

a data storage device storing a configuration inventory for the customer computer system wherein the configuration inventory includes metadata profiles for binaries on the customer computer system;

a data storage device storing configuration information for the customer computer system after the planned software upgrade wherein configuration information includes upgrade information; and an analysis tool for comparing the configuration inventory to the upgrade information to determine the impact of the planned software upgrade on the customer computer system, wherein comparing the metadata profiles for binaries with the upgrade information and based on the comparison of the metadata profiles for binaries with the upgrade information classifying the binaries as safe binaries or at-risk binaries, wherein the classifying further includes classifying the at-risk binaries into two or more subset based on a determined risk of failure to run after the planned software upgrade.

26. The computer system of claim 25, wherein the configuration inventory includes an application interfaces profile for the customer computer system and wherein the analysis tool determines the impact based on a comparison of the application interfaces profile with application interface rules in the configuration information.

27. The computer system of claim 25, wherein the configuration inventory includes a profile of third party software on the customer computer system and wherein the analysis tool determines the impact based on a comparison of the third party software profile with the configuration information.

28. The computer system of claim 25, wherein the configuration inventory includes a hardware profile, an operating system or environment profile, a middleware profile, an application interfaces profile, and an applications profile, and wherein the analysis tool has analysis engines for sequentially analyzing each of the profiles based on the configuration information.

29. The computer system of claim 25, wherein the customer computer system includes two operating systems, and the computer system further includes a report generator adapted to generate a report showing the determined impact for the two operating systems.

30. The computer system of claim 25, wherein the configuration information includes rules for two or more upgrade levels, and the computer system further includes a report generator adapted to generate a report showing the impact for the upgrade levels.

31. The computer system of claim 30, wherein the upgrade levels include implementation rules for different implementations of an operating system included in the planned software upgrade.

32. The computer system of claim 25, wherein the customer computer system includes two or more subsystems having differing configuration complexities, and the computer system further includes a report generator adapted to generate a report showing the impact for the subsystems.

33. The computer system of claim 25, further including a report generator adapted to generate a report comparing a first financial metric determined for the customer computer system based on the configuration inventory to a second financial metric based on the configuration information for the customer computer system after the planned software upgrade.

34. The computer system of claim 33, wherein each financial metric is determined for the customer computer system based on an individual system within the customer computer system.

\* \* \* \* \*

UNITED STATES PATENT AND TRADEMARK OFFICE
CERTIFICATE OF CORRECTION

| | | |
|---|---|---|
| PATENT NO. | : 7,191,435 B2 | Page 1 of 1 |
| APPLICATION NO. | : 10/164946 | |
| DATED | : March 13, 2007 | |
| INVENTOR(S) | : Michael Lau et al. | |

It is certified that error appears in the above-identified patent and that said Letters Patent is hereby corrected as shown below:

Column 15, line 67, insert --after-- after "run"

Signed and Sealed this

Eighth Day of May, 2007

JON W. DUDAS
*Director of the United States Patent and Trademark Office*